(12) United States Patent
Behabtu

(10) Patent No.: US 11,802,356 B2
(45) Date of Patent: *Oct. 31, 2023

(54) NONWOVEN GLUCAN WEBS

(71) Applicant: NUTRITION & BIOSCIENCES USA 4, INC., Rochester, NY (US)

(72) Inventor: Natnael Behabtu, Wilmington, DE (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/149,156

(22) Filed: Jan. 14, 2021

(65) Prior Publication Data

US 2021/0310165 A1 Oct. 7, 2021

Related U.S. Application Data

(63) Continuation of application No. 15/373,547, filed on Dec. 9, 2016, now Pat. No. 10,895,028.

(60) Provisional application No. 62/266,754, filed on Dec. 14, 2015.

(51) Int. Cl.
| | |
|---|---|
| *D04H 1/4266* | (2012.01) |
| *C08B 37/00* | (2006.01) |
| *D04H 1/56* | (2006.01) |
| *C08L 5/00* | (2006.01) |
| *D01F 9/00* | (2006.01) |

(52) U.S. Cl.
CPC ....... *D04H 1/4266* (2013.01); *C08B 37/0009* (2013.01); *C08L 5/00* (2013.01); *D01F 9/00* (2013.01); *D04H 1/56* (2013.01)

(58) Field of Classification Search
CPC ..... D01F 2/00; D01F 9/00; D01F 4/00; C08B 37/00

See application file for complete search history.

(56) References Cited

U.S. PATENT DOCUMENTS

| | | | | |
|---|---|---|---|---|
| 7,000,000 | B1 * | 2/2006 | O'Brien | C12P 19/08 536/124 |
| 10,895,028 | B2 * | 1/2021 | Behabtu | D04H 1/4266 |
| 2010/0168365 | A1 * | 7/2010 | Umemoto | C08G 63/81 527/300 |
| 2014/0179913 | A1 * | 6/2014 | Paullin | C12P 19/18 536/120 |
| 2014/0187767 | A1 * | 7/2014 | Kasat | C08J 5/18 536/119 |
| 2016/0060792 | A1 * | 3/2016 | Dürnberger | D01F 9/00 162/157.7 |
| 2017/0002335 | A1 * | 1/2017 | Payne | C12P 19/04 |

* cited by examiner

*Primary Examiner* — Jennifer A Steele

(57) ABSTRACT

Nonwoven webs formed from modified 1,3-α-D-glucan polymer and methods of forming the nonwoven webs are disclosed. The modified 1,3-α-D-glucan polymer can have a number average degree of polymerization in the range of from 55 to 10,000. The nonwoven webs can be used for personal hygiene wipes, filtration media, apparel or other uses.

19 Claims, No Drawings

NONWOVEN GLUCAN WEBS

CROSS-REFERENCE TO RELATED APPLICATION

This application is a continuation of U.S. application Ser. No. 15/373,547 (filed Dec. 9, 2016, now U.S. patent Ser. No. 10/895,028), which claims the benefit of priority of U.S. Provisional Application No. 62/266,754 (filed on Dec. 14, 20151), both of which prior applications are hereby incorporated by reference in their entirety.

FIELD OF THE DISCLOSURE

The present disclosure is directed towards a nonwoven web of a modified 1,3-α-D-glucan polymer and processes for producing the web.

BACKGROUND

Nonwoven webs are important materials in industry today. Many of the medical care garments, protective wear garments, mortuary and veterinary products and personal care products in use today are partially or wholly constructed of nonwoven web materials. Examples of such products include everyday items like personal hygiene wipes, diapers, training pants, swimwear, incontinence garments, pads, sanitary napkins, as well as antimicrobial surgical gowns and bandages, protective workwear garments such as coveralls and lab coats and the like. Nonwoven fibrous webs provide tactile, comfort and aesthetic properties that can approach those of traditional woven or knitted cloth materials. Nonwoven web materials are also widely used as filtration medial for both liquid and gas or air filtration applications (e.g., high efficiency particle air (HEPA) filtration) since they can be formed into a filter mesh of fine fibers having a low average pore size suitable for trapping particulate matter while still having a low pressure drop across the mesh.

Nonwoven web materials have a physical structure or individual fibers or filaments that are interlaid in a generally random manner rather than in a regular, identifiable manner as in a knitted or woven fabric. The fibers of a nonwoven web may be continuous or discontinuous, and, are frequently made from thermoplastic polymer or copolymer resins from the general classes of polyolefins, polyesters, and polyamides as well as numerous other polymers.

Various methods have been disclosed in the art for preparing nonwoven webs. In general, the first step is to produce the web of fibers, for example by dry-laid, wet-laid, or molten polymer laid methods. Once the initial webs have been formed, they can be consolidated to increase the structural integrity by bonding at least a portion of the fibers together.

Bonding can occur via chemical, mechanical, thermal, solvent bonding or other methods. Finally, webs can have an optional finishing step which applies one or more treatments to improve the properties of the nonwoven web. Some examples of properties that can be improved by the finishing treatments can include, dye uptake, absorbency, repellency, texture, and antimicrobial activity.

The majority of the nonwoven webs on the market today are produced from man-made polymers. There is a continuing need for producing nonwoven webs from polymers made from renewable resources.

SUMMARY

The present disclosure relates to a process of forming a nonwoven web, wherein the process comprises:

a) introducing a solution of an 1,3-α-D-glucan polymer into a chamber;
b) contacting a pressurized gas with the solution of step (a) in the chamber to form fibers; and
a) collecting the fibers to form a nonwoven web;

wherein the 1,3-α-D-glucan polymer is a modified 1,3-α-D-glucan polymer.

The disclosure also relates to a nonwoven web comprising a modified 1,3-α-D-glucan polymer, wherein the 1,3-α-D-glucan polymer comprises 90% or greater α-1,3-glycosidic linkages, less than 1% by weight of α-1,3,6-glycosidic branch points, a number average degree of polymerization in the range of from 55 to 10,000.

DETAILED DESCRIPTION

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

Unless otherwise disclosed, the terms "a" and "an" as used herein are intended to encompass one or more (i.e., at least one) of a referenced feature.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As Used Herein:

The phrase "1,3-α-D-glucan polymer" means a polysaccharide comprising glucose monomer units linked together by glycosidic linkages wherein at least 50% of the glycosidic linkages are α-1,3-glycosidic linkages. In other embodiments, the percentage of α-1,3-glycosidic linkages can be greater than or equal to 90%, 95%, 96%, 97%, 98%, 99% or 100% (or any integer value between 50% and 100%). Accordingly, the 1,3-α-D-glucan polymer comprises less than or equal to 10%, 5%, 4%, 3%, 2%, or 0% of glycosidic linkages that are not α-1,3-glycosidic linkages. The 1,3-α-D-glucan polymer also has a number average degree of polymerization in the range of from 55 to 10,000.

The terms "glycosidic linkage" refers to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha- D-glucose rings. Herein, "alpha-D-glucose" will be referred to as "glucose". The phrase "consists essentially of" or "consisting essentially of" means that a composition contains all of the recited components and less than 5% by weight, based on the total weight of the composition of any other component or combination of components. For example, a composition consisting essentially of A and B must contain at least 95% by weight of A and B and no more than 5% by weight of any other component or combination components, wherein the percentage by weight is based on the total weight of the composition. In other embodiments, the phrase consisting essentially of means that the composition contains less than 4% or 3% or 2% or 1% or less than 0.5% by weight of the components that are not recited, based on the total weight of the composition.

The "molecular weight" of the 1,3-α-D-glucan polymer herein can be represented as number-average molecular weight (Mn) or as weight-average molecular weight (Mw), the units of which are in Daltons or grams/mole. Alternatively, molecular weight can be represented as DPw (weight average degree of polymerization) or DPn (number average degree of polymerization). The molecular weights and degrees of polymerization are related. For example, DPw can be calculated from the Mw, by dividing the Mw by 162.14. Various means are known in the art for determining these molecular weight measurements such as with high-pressure liquid chromatography (HPLC) or size exclusion chromatography (SEC).

The term "fibers" refers to both staple length fibers and continuous fibers.

As used herein the term "nonwoven web" means a web having a structure of individual fibers or filaments which are interlaid, but not in an identifiable manner as in a knitted or woven fabric.

The nonwoven web comprises or consists essentially of the 1,3-α-D-glucan polymer wherein the 1,3-α-D-glucan polymer is modified. As used herein the phrase "modified 1,3-α-D-glucan polymer" means an 1,3-α-D-glucan polymer wherein one or more of the hydroxyl groups of the 1,3-α-D-glucan polymer have been derivatized by one or more organic groups. The organic group can be alkylcarboxy, ether, benzyl, ester groups or a combination thereof. The modified 1,3-α-D-glucan polymer can be represented by Structure 1:

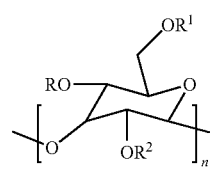

wherein n is from 55 to 10,000; R, $R^1$ and $R^2$ are independently chosen from hydrogen, alkyl, benzyl, —C(O)H, —C(O)alkyl or a combination thereof, wherein at least one of R, $R^1$, or $R^2$ in the 1,3-α-D-glucan polymer is not hydrogen.

The term "degree of substitution" (DoS) as used herein refers to the average number of hydroxyl groups substituted in each monomeric unit (glucose) of a modified 1,3-α-D-glucan polymer. The unmodified 1,3-α-D-glucan polymer comprises hydrogen for each R, $R^1$ and $R^2$ in each monomeric unit, and therefore, the degree of substitution can be no higher than 3. Those of ordinary skill in the art would understand that a DoS of 3 may be difficult to attain. Therefore, a DoS of 3 means the maximum attainable DoS for the given R, $R^1$, or $R^2$ groups under the reaction conditions. As an example, it may be possible to achieve a DoS of 3 for a methyl ether modified 1,3-α-D-glucan polymer, while for a benzyl modified 1,3-α-D-glucan polymer, a DoS of 3 may be more difficult to achieve due the steric hindrance of the bulky benzyl groups when compared to the relatively less bulky methyl groups of the methyl ether.

The term "alkyl", used either alone or in compound words such as "alkylthio" or "haloalkyl" includes straight-chain or branched alkyl such as, for example, methyl, ethyl, n-propyl, i-propyl, or the different butyl, pentyl or hexyl isomers.

The term "Cx to Cy" with respect to an alkyl group means that the alkyl contains in the range of x to y carbon atoms. For example, a $C_1$ to $C_5$ alkyl group means that the alkyl group can have 1 carbon atom (methyl), 2 carbon atoms (ethyl), 3 carbon atoms (propyl), 4 carbon atoms (butyl) or 5 carbon atoms (pentyl). For those groups that are able to form isomers, for example, n-propyl and isopropyl, the term means any of the possible isomers and is not intended to limit to one isomer.

The terms "substantially anhydrous" and "anhydrous" are used interchangeably herein. Substantially anhydrous conditions are conditions in which there is less than about 1.5 wt % or 2.0 wt % water. Such conditions may characterize a reaction or a reaction component, for example.

The unmodified 1,3-α-D-glucan polymer can be produced using an enzymatic method, for example, a method using glucosyl transferase enzymes as provided by U.S. Pat. No. 7,000,000 or U.S. Pat. No. 8,871,474. In some embodiments, the 1,3-α-D-glucan polymer is produced by a glucosyltransferase enzyme having 90% or greater sequence identity to Gtf J. An enzymatic production of the 1,3-α-D-glucan polymer can result in a number average degree of polymerization (DPn) in the range of from 55 to 10,000. In other embodiments, the DPn can be in the range of from 75 to 1,000 and, in still further embodiments, in the range of from 100 to 800. The number average degree of polymerization can be determined by size exclusion chromatography.

The enzymes disclosed in the above references are also particularly useful for producing 1,3-α-D-glucan polymer having greater than or equal to 90% α-1,3-glycosidic linkages. The 1,3-α-D-glucan polymer comprising greater than or equal to 90% α-1,3-glycosidic linkages is herein to be considered a linear polymer having a homogeneous structure. By homogeneous structure is meant that the 1,3-α-D-glucan polymer has less than 10% linkages that are not α-1,3-glycosidic linkages, for example, α-1,6-glycosidic linkages, α-1,4-glycosidic linkages or α-1,3,6-glycosidic branch points. In other embodiments, the 1,3-α-D-glucan polymer comprises greater than or equal to 91% α-1,3-glycosidic linkages or greater than or equal to 92% or 93% or 94% or 95% or 96% or 97% or 98% or 99% α-1,3-glycosidic linkages and less than 9% or 8% or 7% or 6% or 5% or 4% or 3% or 2% or 1% of glycosidic linkages that are not α-1,3-linkages. In still further embodiments, the 1,3-α-D-glucan polymer is a linear polymer having greater than or equal to 99% of α-1,3-glycosidic linkages and less than 1% α-1,3,6-glycosidic branch points.

As used herein the percentage of α-1,3-glycosidic linkages refers to the average number of monomer units that are linked via α-1,3-glycosidic linkages divided by the total number of monomer units in the polymer composition (×100). The percentage of α-1,3-glycosidic linkages is determined via integration of the peaks in an 1H NMR spectrum, wherein a sample of the 1,3-α-D-glucan polymer is dissolved in $d_6$-dimethyl sulfoxide (DMSO) containing 3 percent by weight LiCl and 0.1 milliliters of trifluoroacetic acid in $d_6$-DMSO. The percentages of linkages that are not α-1,3-glycosidic linkages can be determined in the same manner and using the same general formula.

The 1,3-α-D-glucan polymer can be produced via the methods described in, for example, U.S. Pat. No. 7,000,00 or U.S. Pat. No. 8,871,474. Once the 1,3-α-D-glucan polymer has been produced and optionally isolated, it can then be modified by one or more organic groups. The organic groups can be one or more of alkylcarboxy, ether, benzyl, formyl, ester groups or a combination thereof. In some embodiments, the organic group can be an ether group. In this case, each R, $R^1$, and $R^2$ of structure 1 may be alkyl groups, for example, $C_1$ to $C_{10}$ alkyl group wherein the alkyl group are straight chain or branched alkyl groups and wherein the alkyl ether groups are optionally substituted.

Each R, $R^1$, and $R^2$ group in the ether modified 1,3-α-D-glucan polymer herein can independently be an H or an alkyl group. The alkyl group may be, for example, a methyl, ethyl, propyl, butyl, pentyl, hexyl, heptyl, octyl, nonyl, or decyl group, for example. In some embodiments, the alkyl group may be a substituted alkyl group in which there is a substitution on one or more carbons of the alkyl group. The substitution(s) may be one or more hydroxyl, aldehyde, ketone, and/or carboxyl groups. For example, a substituted alkyl group may be a hydroxy alkyl group, dihydroxy alkyl group, or carboxy group.

Examples of suitable hydroxy alkyl groups are hydroxymethyl (—$CH_2OH$), hydroxyethyl (e.g., —$CH_2CH_2OH$, —$CH(OH)CH_3$), hydroxypropyl (e.g., —$CH_2CH_2CH_2OH$, —$CH_2CH(OH)CH_3$, —$CH(OH)CH_2CH_3$), hydroxybutyl and hydroxypentyl groups. Other examples include dihydroxy alkyl groups (diols) such as dihydroxymethyl, dihydroxyethyl (e.g., —$CH(OH)CH_2OH$), dihydroxypropyl (e.g., —$CH_2CH(OH)CH_2OH$, —$CH(OH)CH(OH)CH_3$), dihydroxybutyl and dihydroxypentyl groups.

Examples of suitable alkylcarboxy include, for example methylcarboxy (—$CH_2COOH$), ethylcarboxy (e.g., —$CH_2CH_2COOH$, —$CH(COOH)CH_3$), propylcarboxy (e.g., —$CH_2CH_2CH_2COOH$, —$CH_2CH(COOH)CH_3$, —$CH(COOH)CH_2CH_3$), butylcarboxy, and pentlylcarboxy groups.

In other embodiments, one or more carbons of an alkyl group can have a substitution(s) with another alkyl group. Examples of such substituent alkyl groups are methyl, ethyl and propyl groups. To illustrate, an R group can be —CH($CH_3$)$CH_2CH_3$ or —$CH_2CH(CH_3)CH_3$, which are both propyl groups having a methyl substitution.

As should be clear from the above examples of various substituted alkyl groups, a substitution (e.g., hydroxy or carboxy group) on an alkyl group in certain embodiments may be bonded to the terminal carbon atom of the alkyl group, where the terminal carbon group is opposite the carbon atom that is ether linked to the oxygen of the 1,3-α-D-glucan polymer. An example of this terminal substitution is in the hydroxypropyl group —$CH_2CH_2CH_2OH$. Alternatively, a substitution may be on an internal carbon atom of an alkyl group. An example on an internal substitution is in the hydroxypropyl group —$CH_2CH(OH)CH_3$. An alkyl group can have one or more substitutions, which may be the same (e.g., two hydroxyl groups [dihydroxy]) or different (e.g., a hydroxyl group and a carboxyl group).

The 1,3-α-D-glucan polymer can be modified with one kind of ether group. For example, a formula of structure 1 may contain R, $R^1$, and/or $R^2$ groups wherein at least one of R, $R^1$, and/or $R^2$ is methyl. Thus, the only ether group that is present in the ether modified 1,3-α-D-glucan polymer is the methyl ether. In other embodiments, the 1,3-α-D-glucan polymer can be modified with more than one type of ether group. For example, a formula of structure 1 may contain R, $R^1$, and/or $R^2$ groups that are hydrogen, methyl and ethyl. Thus, the ether groups are methyl and ethyl.

The ether modified 1,3-α-D-glucan polymer can be produced by a method comprising: contacting poly alpha-1,3-glucan in a reaction vessel with a base or under alkaline conditions with at least one etherification agent. Optionally, the ether modified 1,3-α-D-glucan polymer can be isolated.

The following steps can be taken to prepare the above etherification reaction. The 1,3-α-D-glucan polymer can be contacted with water and a base, for example, or one or more alkali hydroxides to provide a solution or mixture. In some embodiments, the alkaline conditions of the reaction can comprise an alkali hydroxide solution. The pH of the alkaline solution can be greater than or equal to about 11.0, 11.2, 11.4, 11.6, 11.8, 12.0, 12.2, 12.4, 12.6, 12.8 or 13.0.

Various bases can be used, for example, sodium hydroxide, potassium hydroxide, calcium hydroxide, lithium hydroxide, and/or tetraethylammonium hydroxide. The concentration of alkali hydroxide in the water can be from about 1-70 wt %, 5-50 wt %, 10-50 wt %, 10-40 wt % or 10-30 wt % (or any integer between 1 and 70 wt %). In some embodiments, the concentration of alkali hydroxide such as sodium hydroxide can be at least about 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 wt %, wherein the percentages by weight are based on the weight of the water and the base. An alkali hydroxide used to prepare alkaline conditions may be in a completely aqueous solution or an aqueous solution comprising one or more water-soluble organic solvents such as ethanol or isopropanol. Alternatively, an alkali hydroxide can be added as a solid to provide alkaline conditions.

Various organic solvents that can optionally be included when preparing the reaction include alcohols, acetone, dioxane, isopropanol and toluene, for example; none of these solvents dissolve the 1,3-α-D-glucan polymer. Toluene or isopropanol can be used in certain embodiments. An organic solvent can be added before or after addition of a base. The concentration of an organic solvent (e.g., isopropanol or toluene) in a preparation comprising the 1,3-α-D-glucan polymer and base can be at least about 10, 15, 20, 25, 30, 35, 40, 45, 50, 55, 60, 65, 70, 75, 80, 85, or 90 wt % (or any integer between 10 and 90 wt %).

Alternatively, solvents that can dissolve the 1,3-α-D-glucan polymer can be used when preparing the reaction. These solvents include, but are not limited to, dimethyl sulfoxide, lithium chloride(LiCl)/N,N-dimethyl-acetamide (DMAc), SO2/diethylamine (DEA)/dimethyl sulfoxide (DMSO), LiCl/1,3-dimethyl-2-imidazolidinone (DMI), N,N-dimethylformamide (DMF)/N2O4, DMSO/tetrabutylammonium fluoride trihydrate (TBAF), N-methylmorpholine-N-oxide (NMMO), tri(2-aminoethyl)amineNi(OH)$_2$ aqueous solutions and melts of LiClO4·3H2O, NaOH/urea aqueous solutions, aqueous sodium hydroxide, aqueous potassium hydroxide, formic acid, and ionic liquids.

The 1,3-α-D-glucan polymer can be contacted with a solvent and the base with mixing of the components. Such mixing can be performed during or after adding these components with each other. Mixing can be performed, for example, by manual mixing, mixing using an overhead mixer, using a magnetic stir bar or by shaking. In certain embodiments, the 1,3-α-D-glucan polymer can first be mixed in water or an aqueous solution before it is mixed with a solvent and/or base.

After contacting the 1,3-α-D-glucan polymer, solvent, and base with each other, the resulting composition can optionally be maintained at ambient temperature for up to 14 days. The term "ambient temperature" as used herein refers to a temperature between about 15 to 30° C. or 20 to 25° C. (or any integer between 15 and 30° C.). Alternatively, the composition can be heated with or without reflux at a temperature from about 30° C. to about 150° C. (or any integer between 30 and 150° C.) for up to about 48 hours. The composition in certain embodiments can be heated at about 55° C. for about 30 minutes or 60 minutes. Thus, a composition obtained from mixing the 1,3-α-D-glucan polymer, solvent, and base with each other can be heated at about 50, 51, 52, 53, 54, 55, 56, 57, 58, 59 or 60° C. for about 30-90 minutes.

An etherification agent comprising an organic group can be contacted with the 1,3-α-D-glucan polymer in a reaction under basic conditions to produce the ether modified 1,3-α-D-glucan polymer. For example, an etherification agent can be added to a composition prepared by contacting the 1,3-α-D-glucan polymer, solvent, and one or more alkali hydroxides with each other as described above. Alternatively, an etherification agent can be included when preparing the basic conditions (e.g., an etherification agent can be mixed with the 1,3-α-D-glucan polymer and solvent before mixing with alkali hydroxide).

An etherification agent herein refers to an agent that can be used to etherify one or more hydroxyl groups of the glucose units of the 1,3-α-D-glucan polymer with an organic group as defined above.

Etherification agents suitable for preparing an ether modified 1,3-α-D-glucan polymer include, for example, dialkyl sulfates, dialkyl carbonates, alkyl halides (e.g., alkyl chloride), iodoalkanes, alkyl triflates (alkyl trifluoromethanesulfonates) and alkyl fluorosulfonates. Thus, examples of etherification agents for producing the methyl ether of the 1,3-α-D-glucan polymer includes dimethyl sulfate, dimethyl carbonate, methyl chloride, iodomethane, methyl triflate and methyl fluorosulfonate. Examples of etherification agents for producing the ethyl ether of the 1,3-α-D-glucan polymer include diethyl sulfate, diethyl carbonate, ethyl chloride, iodoethane, ethyl triflate and ethyl fluorosulfonate. Examples of etherification agents for producing the propyl ether of the 1,3-α-D-glucan polymer include dipropyl sulfate, dipropyl carbonate, propyl chloride, iodopropane, propyl triflate and propyl fluorosulfonate. Examples of etherification agents for producing the butyl ether of the 1,3-α-D-glucan polymer include dibutyl sulfate, dibutyl carbonate, butyl chloride, iodobutane and butyl triflate.

Etherification agents suitable for preparing a hydroxyalkyl ether of the 1,3-α-D-glucan polymer include, for example, alkylene oxides such as ethylene oxide, propylene oxide (e.g., 1,2-propylene oxide), butylene oxide (e.g., 1,2-butylene oxide; 2,3-butylene oxide; 1,4-butylene oxide), or combinations thereof. As examples, propylene oxide can be used as an etherification agent for preparing the hydroxypropyl ether of the 1,3-α-D-glucan polymer, and ethylene oxide can be used as an etherification agent for preparing the hydroxyethyl ether of the 1,3-α-D-glucan polymer. Alternatively, hydroxyalkyl halides (e.g., hydroxyalkyl chloride) can be used as etherification agents for preparing hydroxyalkyl ethers of the 1,3-α-D-glucan polymer. Examples of hydroxyalkyl halides include hydroxyethyl halide, hydroxypropyl halide (e.g., 2-hydroxypropyl chloride, 3-hydroxypropyl chloride) and hydroxybutyl halide. Alternatively, alkylene chlorohydrins can be used as etherification agents for preparing hydroxyalkyl ethers of the 1,3-α-D-glucan polymer. Alkylene chlorohydrins that can be used include, but are not limited to, ethylene chlorohydrin, propylene chlorohydrin, butylene chlorohydrin, or combinations of these.

Etherification agents suitable for preparing a dihydroxyalkyl ether of the 1,3-α-D-glucan polymer include dihydroxyalkyl halides (e.g., dihydroxyalkyl chloride) such as dihydroxyethyl halide, dihydroxypropyl halide (e.g., 2,3-dihydroxypropyl chloride [i.e., 3-chloro-1,2-propanediol]), or dihydroxybutyl halide, for example. 2,3-dihydroxypropyl chloride can be used to prepare the dihydroxypropyl ether of the 1,3-α-D-glucan polymer, for example.

Etherification agents suitable for preparing a carboxyalkyl ether of the 1,3-α-D-glucan polymer may include haloalkylates (e.g., chloroalkylate). Examples of haloalkylates include haloacetate (e.g., chloroacetate), 3-halopropionate (e.g., 3-chloropropionate) and 4-halobutyrate (e.g., 4-chlorobutyrate). For example, chloroacetate (monochloroacetate) (e.g., sodium chloroacetate or chloroacetic acid) can be used as an etherification agent to prepare the carboxymethylated 1,3-α-D-glucan polymer.

When producing the ether modified 1,3-α-D-glucan polymer with two or more different organic groups, two or more different etherification agents could be used, accordingly. For example, both an alkylene oxide and an alkyl chloride could be used as etherification agents to produce an alkyl hydroxyalkyl ether of the 1,3-α-D-glucan polymer. Any of the etherification agents disclosed herein may therefore be combined to produce the ether modified 1,3-α-D-glucan polymer with two or more different organic groups. Such two or more etherification agents may be used in the reaction at the same time, or may be used sequentially in the reaction. When used sequentially, any of the temperature-treatment (e.g., heating) steps disclosed below may optionally be used between each addition. One may choose sequential introduction of etherification agents in order to control the desired DoS of each organic group. In general, a particular etherification agent would be used first if the organic group it forms in the ether product is desired at a higher DoS compared to the DoS of another organic group to be added.

The amount of etherification agent to be contacted with the 1,3-α-D-glucan polymer in a reaction under alkaline conditions can be determined based on the degree of substitution required in the ether modified 1,3-α-D-glucan polymer being produced. The amount of ether substitution groups on each monomeric unit in the ether modified 1,3-α-D-glucan polymer can be determined using nuclear magnetic resonance (NMR) spectroscopy. In general, an etherification agent can be used in a quantity of at least about 0.05 mole per mole of the 1,3-α-D-glucan polymer. There is no upper limit to the quantity of etherification agent that can be used.

Reactions for producing the ether modified 1,3-α-D-glucan polymer can optionally be carried out in a pressure vessel such as a Parr reactor, an autoclave, a shaker tube or any other pressure vessel well known in the art. A shaker tube can be used to perform the reaction in certain embodiments.

A reaction herein can optionally be heated following the step of contacting the 1,3-α-D-glucan polymer with an etherification agent under basic, for example, alkaline conditions. The reaction temperatures and time of applying such temperatures can be varied within wide limits. For example, a reaction can optionally be maintained at ambient temperature for up to 14 days. Alternatively, a reaction can be heated, with or without reflux, between about 25° C. to about 200° C. (or any integer between 25 and 200° C.). The reaction time can be varied correspondingly: relatively more time at a low temperature and relatively less time at a high temperature.

Following the formation of the desired ether modified 1,3-α-D-glucan polymer, the product can be isolated in any process known in the art. For example, the pH of the reaction mixture can be neutralized. Neutralization of a reaction can be performed using one or more acids. The term "neutral pH" as used herein, refers to a pH that is neither substantially acidic or basic (e.g., a pH of about 6-8, or about 6.0, 6.2, 6.4, 6.6, 6.8, 7.0, 7.2, 7.4, 7.6, 7.8, or 8.0). Various acids that can be used for this purpose include, but are not limited to, sulfuric, acetic, hydrochloric, nitric, any mineral (inorganic) acid, any organic acid, or any combination of these acids.

The ether modified 1,3-α-D-glucan polymer produced in a reaction herein can optionally be washed one or more times with a liquid that does not readily dissolve the compound. The ether modified 1,3-α-D-glucan polymer can be washed with a solvent, for example, water, an organic solvent, alcohol, acetone, an aromatic or any combination of these, depending on the solubility of the ether compound therein (where lack of solubility is desirable for washing). In general, a solvent comprising an organic solvent such as alcohol is preferred for washing the ether modified 1,3-α-D-glucan polymer. The ether modified 1,3-α-D-glucan polymer can be washed one or more times with an aqueous solution containing methanol or ethanol, for example. For example, 70-95 wt % ethanol can be used to wash the product. The ether modified 1,3-α-D-glucan polymer can be washed with a methanol:acetone, for example, a 60:40 (v/v) solution in another embodiment. Hot water (about 95-100° C.) can be used in certain embodiments, such as for washing an alkyl ether of the 1,3-α-D-glucan polymer, for example, an ethyl ether, an alkyl hydroxyalkyl ether, or an ethyl hydroxyethyl ether.

The ether modified 1,3-α-D-glucan polymer produced in the disclosed reaction can be isolated. This step can be performed before or after neutralization and/or washing steps using a funnel, centrifuge, press filter, or any other method or equipment known in the art that allows removal of liquids from solids. For example, a Buchner funnel may be used to isolate the ether modified 1,3-α-D-glucan polymer product. An isolated ether modified 1,3-α-D-glucan polymer can be dried using any method known in the art, such as vacuum drying, air drying, or freeze drying.

Any of the above etherification reactions can be repeated using an ether modified 1,3-α-D-glucan polymer as the starting material for further modification. This approach may be suitable for increasing the DoS of an organic group, and/or adding one or more different organic groups to the ether product. For example, the dihydroxypropyl ether of the 1,3-α-D-glucan polymer can be used as a substrate for further modification with dihydroxypropyl groups.

The structure, molecular weight and degree of substitution of an ether modified 1,3-α-D-glucan polymer can be confirmed using various physiochemical analyses known in the art such as NMR spectroscopy and size exclusion chromatography (SEC).

The 1,3-α-D-glucan polymer according to structure 1 can also comprise one or more of an ester or a formate group, for example wherein at least one of R, $R^1$, and $R^2$ is a —C(O)H or —C(O)alkyl group. The term "acyl group" means an organic radical derived from an organic carboxylic acid by removal of the hydroxyl group, for example, the —C(O) alkyl group can be, for example, an acetyl group (—CO—$CH_3$), propionyl group (—CO—$CH_2$—$CH_3$), butyryl group (—CO—$CH_2$—$CH_2$—$CH_3$), pentanoyl group (—CO—$CH_2$—$CH_2$—$CH_2$—$CH_3$), hexanoyl group (—CO—$CH_2$—$CH_2$—$CH_2$—$CH_2$—$CH_3$), heptanoyl group (—CO—$CH_2$—$CH_2$—$CH_2$—$CH_2$—$CH_2$—$CH_3$), octanoyl group (—CO—$CH_2$—$CH_2$—$CH_2$—$CH_2$—$CH_2$—$CH_2$—$CH_3$) or a combination thereof. In some embodiments, more than one acyl group can be present in the ester modified 1,3-α-D-glucan polymer. In other embodiments, both an acetyl group and a propionyl group are present. In cases where two different ester groups are present, the product can be referred to as mixed esters.

In order to produce the ester modified 1,3-α-D-glucan polymer, the 1,3-α-D-glucan polymer must be anhydrous or substantially anhydrous. The method comprises: contacting the 1,3-α-D-glucan polymer in a reaction that is anhydrous or substantially anhydrous with at least one acid catalyst, at least one acid anhydride, and at least one organic acid, wherein an acyl group derived from the acid anhydride is esterified to the 1,3-α-D-glucan polymer thereby producing the ester modified 1,3-α-D-glucan polymer.

The 1,3-α-D-glucan polymer is contacted with at least one acid catalyst, at least one acid anhydride, and at least one organic acid in a reaction that is substantially anhydrous. A substantially anhydrous reaction herein contains no water or less than about 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 wt % water. Substantially anhydrous conditions can be obtained by using reaction components that are substantially anhydrous. Reaction components that are not substantially anhydrous may be used for preparing a reaction, but only in amounts such that the final reaction preparation is substantially anhydrous.

Enzymatically produced preparations of the 1,3-α-D-glucan polymer that can be used in the disclosed esterification reaction typically contain water. This 1,3-α-D-glucan polymer can be acid-exchanged to remove water thereby rendering the glucan to be substantially anhydrous. In certain embodiments, the 1,3-α-D-glucan polymer can be acid-exchanged with an organic acid (e.g., acetic, propionic, or butyric acid) before contacting step (a) to remove water from the 1,3-α-D-glucan polymer. An acid-exchange process herein can comprise boiling the 1,3-α-D-glucan polymer in water, removing most of the water by any physical means (e.g., filtration, decantation, and/or drying), placing the glucan in an organic acid, and then removing the organic acid by filtration and/or decantation. Treatment with an organic acid can comprise stirring the glucan in the acid, and can be performed one, two, or more times. The amount of organic acid used in each treatment can be, for example, at least about 2 to 20 times, or 2 to 10 times the amount of the 1,3-α-D-glucan polymer being treated.

The 1,3-α-D-glucan polymer is contacted with at least one acid catalyst in the reaction. An acid catalyst can be an inorganic acid in certain embodiments. Examples of an inorganic acid catalyst that can be included in a reaction herein are sulfuric acid and perchloric acid. Other examples of inorganic acid catalysts include hydrochloric, phosphoric, nitric, boric, hydrofluoric, hydrobromic, sulfonic, any mineral acid, and any combination thereof. The acid catalyst herein can typically be obtained commercially in a concentrated (e.g., >95%, 96%, 97%, 98%, or 99% pure) and/or substantially anhydrous form. For example, sulfuric acid for use in a reaction herein can be at least about 95-98% pure. Alternatively, the acid catalyst can be provided in solution with an organic acid such as acetic acid. An example of such a solution is perchloric acid (0.1 N) in acetic acid. The amount of acid catalyst in the reaction can be at least about 0.005, 0.0075, 0.01, 0.025, 0.05, 0.075, 0.1, 0.25, 0.5, 0.75, 1.0, 1.25, 1.5, 1.75, or 2.0 wt %, based on the total weight of the reaction.

The 1,3-α-D-glucan polymer is contacted with at least one acid anhydride in the reaction. Examples of the acid anhydride that can be used include, for example, acetic anhydride, propionic anhydride, butyric anhydride, pentanoic anhydride, hexanoic anhydride, heptanoic anhydride, octanoic anhydride and phthalic anhydride. Combination of the acid anhydrides can be used in a reaction. For example, combinations of acetic and propionic anhydrides, acetic and butyric anhydrides, propionic and butyric anhydrides can be used in order to form ester modified 1,3-α-D-glucan polymer comprising two different ester groups. The amount of acid anhydride in the reaction can be at least about 10, 15, 20, 25, 30, 35, 40, 45, 50, 55, 60, 65, or 70 wt % (or any integer value between 10 and 70 wt %), for example, based on the total weight of the reaction. In certain embodiments, the amount of acetic anhydride in a reaction can be at least about 20-45 wt %. The amount of propionic or butyric anhydride in other embodiments can be at least about 40-50 wt %.

The 1,3-α-D-glucan polymer is contacted with at least one organic acid in the reaction. Examples of an organic acid that can be included in a reaction herein include acetic acid, propionic acid, butyric acid, pentanoic acid, hexanoic acid, heptanoic acid, octanoic acid and phthalic acid. The amount of organic acid in a reaction can be at least about 5, 10, 15, 20, 25, 30, 35, 40, 45, 50, 55, 60, 65, 70, 75, or 80 wt % (or any integer value between 5 and 80 wt %), based on the total weight of the reaction.

Typically, one or more acid anhydrides used in a reaction are selected based on the type of esterification desired. For example, if esterification of the 1,3-α-D-glucan polymer with acetyl groups, propionyl groups and/or butyryl groups is desired, then acetic anhydride, propionic anhydride and/or butyric anhydride, respectively, is/are included in the reaction accordingly. The selected acid anhydride(s) is the main source of acyl groups in the esterification process. That being said, acyl groups for esterification can also be derived from one or more organic acids included in the reaction. For example, an acetyl group, propionyl group, butyryl group, pentanoyl group, hexanoyl group, heptanoyl group, and octanoyl group can be derived from, respectively, acetic acid, propionic acid, butyric acid, pentanoic acid, hexanoic acid, heptanoic acid, and octanoic acid. Reactions containing a particular acid anhydride typically also contain the organic acid corresponding to the acid anhydride.

In certain embodiments, the acid anhydride is one or more of acetic anhydride, propionic anhydride, or butyric anhydride; and the organic acid is one or more of acetic acid, propionic acid, or butyric acid. In some embodiments, combinations of (i) acetic anhydride and acetic acid can be used to prepare the acetate of the 1,3-α-D-glucan polymer; (ii) propionic anhydride and propionic acid can be used to prepare the propionate of the 1,3-α-D-glucan polymer; (iii) butyric anhydride and butyric acid can be used to prepare the butyrate of the 1,3-α-D-glucan polymer; (iv) propionic anhydride, propionic acid, acetic anhydride and optionally acetic acid can be used to prepare a mixed ester comprising both the acetate and propionate of the 1,3-α-D-glucan polymer; (v) propionic anhydride, propionic acid and acetic acid can be used to prepare a mixed ester comprising both the acetate and propionate of the 1,3-α-D-glucan polymer; (vi) butyric anhydride, butyric acid, acetic anhydride and optionally acetic acid can be used to prepare a mixed ester comprising both the acetate and butyrate of the 1,3-α-D-glucan polymer; and (vii) butyric anhydride, butyric acid and acetic acid can be used to prepare a mixed ester comprising both the acetate and butyrate of the 1,3-α-D-glucan polymer.

Reactions for producing mixed esters typically contain more of an acid anhydride having an acyl group for which a higher DoS is desired, and less of an acid anhydride and/or corresponding organic acid for which a lower DoS is desired. For example, to produce a mixed ester comprising both acetate and propionate esters with a higher DoS of propionyl groups compared to acetyl groups, more propionic anhydride is included in a reaction compared to the amount of acetic anhydride and/or acetic acid. The DoS in mixed esters may also be modulated by the order in which acid anhydrides are added to a reaction already containing an acid catalyst. For example, one may expect a higher DoS with propionyl groups if propionic anhydride is added before acetic anhydride (to a preparation already containing acid catalyst) when preparing a reaction to produce a mixed ester comprising both acetate and propionate groups.

In some embodiments, then acid anhydride selected for the reaction can correspond with the organic acid used to prepare acid-exchanged 1,3-α-D-glucan polymer. For example, if a reaction will include propionic anhydride, then an acid exchange process can be performed with propionic acid. In other embodiments, the acid anhydride selected for a reaction herein can differ from the organic acid used to prepare acid-exchanged 1,3-α-D-glucan polymer. For example, if a reaction will include propionic anhydride, then an acid exchange process can be performed with acetic acid.

In some embodiments, the reaction herein can comprise components in addition to the 1,3-α-D-glucan polymer, acid catalyst, acid anhydride, and organic acid. For example, one or more organic solvents can be included in a reaction, such as methylene chloride. An organic solvent such a methylene chloride can be included at about 30-40 wt % in a reaction (e.g., producing the triacetate of the 1,3-α-D-glucan polymer), for example.

The components of a reaction herein can be added together in any order. For example, the 1,3-α-D-glucan polymer, acid catalyst and organic acid can first be mixed together, after which acid anhydride can be added to the mixture. In other embodiments, the acid anhydride and organic acid can first be mixed together, after which the 1,3-α-D-glucan polymer and acid catalyst can be added to the mixture. In still further embodiments, the acid catalyst and organic acid can first be mixed together, after which the 1,3-α-D-glucan polymer and acid anhydride can be added to the mixture. In other embodiments, the 1,3-α-D-glucan polymer and other components, for example, the acid catalyst or the acid anhydride are added in sequential order to a mixture containing the other reaction components.

Cooling can be applied during various stages of preparing the ester modified 1,3-α-D-glucan polymer. The terms "cool" and "chill" are used interchangeably herein and refer to decreasing the temperature of a reaction or mixture to a lower temperature. Cooling can be performed by any means known in the art, such as with an ice bath or industrial cooling system. Step (a) of preparing a reaction can comprise cooling the reaction after mixing all of the components, for example, the 1,3-α-D-glucan polymer, acid catalyst, acid anhydride and organic acid, to a temperature of 10, 11, 12, 13, 14, 15, 16, 17, 18, 19, or 20° C., or about 12-18° C. In other embodiments, step (a) can comprise cooling to any of the preceding temperatures a mixture containing the 1,3-α-

D-glucan polymer, acid catalyst and organic acid, and then adding acid anhydride to the cooled mixture. In other embodiments, step (a) can comprise cooling to any of the preceding temperatures a mixture containing acid anhydride and organic acid, and then adding the 1,3-α-D-glucan polymer and acid catalyst to the cooled mixture. Alternatively still, step (a) can comprise cooling to any of the preceding temperatures a mixture containing acid catalyst and organic acid, and then adding the 1,3-α-D-glucan polymer and acid anhydride to the cooled mixture. The reaction can optionally be held at any of the preceding cooler temperature points for about 1-10 minutes after its initial preparation.

The reaction can then be (i) placed under ambient temperature conditions without direct application of heat, and/or (ii) directly heated using any means known in the art, for example, using a water bath, an industrial or electric heater. Ambient temperature conditions can be held for up to about 30, 60, 120, 240, 360, or 480 minutes (or any integer value between 30 and 480 minutes), for example. Alternatively, ambient temperature conditions can be held for up to about 24, 48, or 72 hours. The term "ambient temperature" as used herein refers to a temperature between about 15-30° C. or 20-25° C. (or any integer between 15 and 30° C.). Reaction heating can be up to about 30, 35, 40, 45, 50, 55, 60, 65, 70, 75, or 80° C. (or any integer value between 30 and 80° C.), about 30-60° C., or about 30-50° C., for example. Such heating can be done is stages, if desired. For example, a reaction can first be heated to about 35° C., and then heated to about 39-50° C. A maximum reaction temperature (e.g., about 36-43° C.) may be applied to avoid excess degradation of the ester modified 1,3-α-D-glucan polymer molecular weight, for example, such as when producing the propionate, mixed ester comprising acetate and propionate, or a mixed ester comprising acetate and butyrate. The temperature after heating to any of the preceding temperatures can be maintained for about 20-30, 20-40, 20-60 minutes, or up to about 40, 60, 80, 100, 120, or 140 minutes. In some embodiments, when heating is done in stages, the first temperature point(s) can be held for about 20-40 minutes. In embodiments in which a reaction is placed under ambient temperature conditions without direct application of heat, the reaction can subsequently be heated, if desired, to any of the preceding temperatures and time periods.

The reaction can optionally be cooled after any of the above temperature treatments (ambient temperature and/or heating). For example, a reaction can be cooled to about 18, 19, 20, 21, 22, 23, 24, or 25° C., about 20-30° C., or about 20-40° C. A reaction that was heated to 60-80° C. can typically be cooled to about 35-45° C.

Optionally, the reaction can be maintained under an inert gas (e.g., nitrogen). As used herein, the term "inert gas" refers to a gas which does not undergo chemical reactions under a set of given conditions, such as those disclosed for preparing the ester modified 1,3-α-D-glucan polymer.

The reaction can optionally be quenched after any of the above temperature treatments, for example, the ambient temperature and/or heating and cooling treatments. Quenching of the reaction can be accomplished by adding acid, base, or certain salts to the reaction. Various acids, bases and salts useful for quenching a reaction include, but are not limited to, acetic acid, organic acid, magnesium acetate, sodium hydroxide, potassium hydroxide, calcium hydroxide, sodium bicarbonate, sodium carbonate and combinations thereof. In certain embodiments of producing the acetate ester of the 1,3-α-D-glucan polymer, the reaction can be quenched with acetic acid or magnesium acetate.

The quenched reaction can optionally be heated to about 40° C. to 150° C. for up to 48 hours. In some embodiments, the quenched reaction can be heated to about 100° C. for up to about 20-40 minutes. Optionally, water may be added to a reaction (quenched or not quenched), which is then heated to about 40° C. to 150° C. for up to about 20-40 minutes to reduce DoS of the ester groups by hydrolysis.

The ester modified 1,3-α-D-glucan polymer can be precipitated using an agent that is a non-solvent for the ester modified product. For example, water, deionized water and/or methanol can be added to the reaction mixture in an amount sufficient to precipitate the product. Precipitation can further comprise mixing the reaction and the non-solvent by any means known in the art, for example, with an air-powered blender, a magnetic stir bar, mechanical stirring rods.

The precipitated product can optionally be neutralized by washing it with water one or more times, optionally followed by a wash in a bicarbonate, for example, sodium bicarbonate solution. The precipitated product can then be washed one, two or more times with water until neutral pH is achieved. In other embodiments, the precipitated ester modified 1,3-α-D-glucan polymer can be washed with water and base, for example, diluted alkaline hydroxide, sodium hydroxide, calcium hydroxide, and/or potassium hydroxide to achieve a neutral pH, optionally followed by washing with water. The term "neutral pH" as used herein refers to a pH that is neither substantially acidic or basic. In some embodiments, the precipitated product can be washed with water until the pH of the filtrate reaches a pH of about 6-8, or about 6.0, 6.2, 6.4, 6.6, 6.8, 7.0, 7.2, 7.4, 7.6, 7.8, or 8.0.

The ester modified 1,3-α-D-glucan polymer can be isolated. The above precipitation process can be a step in an isolation process.

Isolation can be performed using known techniques, for example, a funnel, centrifuge, press filter, or any other method or equipment known in the art that allows removal of liquids from solids. The isolated ester modified 1,3-α-D-glucan polymer can be dried using any method known in the art, such as vacuum drying, air drying or freeze drying.

Any of the above esterification reactions can be repeated using an ester modified 1,3-α-D-glucan polymer as the starting material for further modification. This approach may be suitable for increasing the DoS of an acyl group, and/or adding one or more different acyl groups to the ester product. In other embodiments, the ester modified 1,3-α-D-glucan polymer may be subjected to modification by other functional groups, for example, one or more ether groups and/or one or more benzyl groups.

The structure, molecular weight and DoS of the ester modified 1,3-α-D-glucan polymer can be confirmed using various physiochemical analyses known in the art such as NMR spectroscopy and size exclusion chromatography (SEC).

The 1,3-α-D-glucan polymer can also be modified with one or more benzyl groups. The 1,3-α-D-glucan polymer can be benzylated by deprotonating one or more of the hydroxyl groups using a base, for example, sodium hydroxide, potassium hydroxide, sodium alkoxide, potassium alkoxide, sodium hydride followed by treatment with a benzylating agent, for example, a benzyl halide. The benzyl group of the benzylating agent can optionally substituted by one or more of halogen, a cyano, an ester, an amide, an ether group, a $C_1$ to $C_6$ alkyl group, an aryl group, a $C_2$ to $C_6$ alkene group, a $C_2$ to $C_6$ alkyne group or a combination thereof. In some embodiments, the benzylating agent can be:

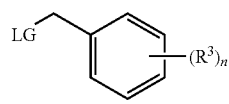

wherein LG is a leaving group, for example, chloride, bromide, iodide; $R^3$ is halogen, cyano, ester, amide, ether, $C_1$ to $C_6$ alkyl, aryl, $C_2$ to $C_6$ alkene, $C_2$ to $C_6$ alkyne; and n is 1, 2, 3, 4 or 5. Halogen can be fluoride, chloride, bromide or iodide. The ester can be benzyl-C(O)O—R', or the ester can be benzyl-OC(O)—R', wherein the R' group is a $C_1$ to $C_6$ alkyl or an aryl group. The ether can be a $C_1$ to $C_6$ alkyl ether or an aryl ether. The amide can be benzyl-C(O)N(R")$_2$ or benzyl-N(R")(O)C—, wherein each R" is independently hydrogen or $C_1$ to $C_6$ alkyl. In each of the above examples, the term 'benzyl' refers to the benzylating agent.

The α-(1→3)-glucan polymer has 3 hydroxyl groups per repeat unit. Therefore, the amount of benzylating agent that can be used is enough to produce a degree of substitution that has a maximum value of 3.0. The phrase "degree of substitution" means the average number of substituent groups, for example, benzyl groups, attached per repeat unit of the α-(1→3)-glucan polymer. For example, a degree of substitution of 0.5 means that, on average, one hydroxyl group per 2 repeat units is substituted by a benzyl group. A degree of substitution of 3 means that all hydroxyl groups of the α-(1→3)-glucan polymer is substituted. In some embodiments, the degree of substitution is in the range of from 0.1 to 0.6. In other embodiments, the degree of substitution is in the range of from 0.1 to 0.5, or from 0.01 to 1.0, or from 0.2 to 0.45, or from 0.4 to 0.6. One method to determine the degree of substitution can be by integration of the peaks of a carbon-13 NMR spectrum. In other embodiments, proton NMR and/or 2-dimensional proton NMR can also be used.

Deprotonation can take place in the presence of a base and an aqueous solvent, a base and an organic solvent or a base and a mixture of an aqueous and organic solvent. Suitable organic solvents can include, for example, dimethyl sulfoxide, dimethyl acetamide, dimethyl formamide, pyridine, 1-methyl-2-pyrrolidinone or a combination thereof. In some embodiments, the 1,3-α-D-glucan polymer can be added to a mixture of the base and the solvent. Optionally, the mixture can be heated. The benzylating agent, for example, benzyl chloride, can then be added. In an aqueous system, as the degree of benzylation increases, the benzyl 1,3-α-D-glucan polymer precipitates from the solution, and can be removed by filtration. By utilizing organic solvents, or varying the temperature or concentration, the degree of substitution can be increased above 0.4. The benzyl 1,3-α-D-glucan polymer can be isolated using known techniques, or can be used as is.

The benzyl α-(1→3)-glucan can have a number average molecular weight in the range of from 10,000 to 2,000,000 daltons. In other embodiments, the number average molecular weight in the range of from 20,000 to 1,500,000, or from 30,000 to 1,250,000, or from 40,000 to 1,000,000, or from 50,000 to 1,000,000, or from 50,000 to 750,000, or from 50,000 to 500,000. The number and weight average molecular weights can be measured by size exclusion chromatography (SEC), for example in dimethyl sulfoxide.

The modified 1,3-α-D-glucan polymer can be modified with one or more of the alkylcarboxy, ether, benzyl, ester groups. In general, if more than one type of organic group is desired, for example, ether and ester groups, then the organic groups are added to the 1,3-α-D-glucan polymer in a sequential manner.

The process of forming the nonwoven web comprises:
a) introducing a solution of an 1,3-α-D-glucan polymer into a chamber;
b) contacting a pressurized gas with the solution of step (a) in the chamber to form fibers; and
b) collecting the fibers to form a nonwoven web;
wherein the solution of the 1,3-α-D-glucan polymer is a modified 1,3-α-D-glucan polymer.

In order to form the solution of the modified 1,3-α-D-glucan polymer, the modified 1,3-α-D-glucan polymer is dissolved in a suitable solvent. The DoS, type or types of organic substitution and the degree of polymerization can all affect the solubility of the modified 1,3-α-D-glucan polymer in the solvent. For example, unmodified 1,3-α-D-glucan polymer is soluble in aqueous base, for example, aqueous alkali metal hydroxide, aqueous sodium hydroxide, aqueous potassium hydroxide, aqueous lithium hydroxide. The concentration of the alkali metal hydroxide in the aqueous base can be in the range of from 2 to 10% by weight, based on the total weight of the water and the alkali metal hydroxide. In other embodiments, the concentration of the alkali metal hydroxide can be in the range of from 3 to 9% by weight or from 4 to 8% by weight, wherein the percentages by weight are based on the total weight of water and the alkali metal hydroxide. As the DoS increases, the modified 1,3-α-D-glucan polymer can become more soluble in organic solvents. Similarly, as the number of carbon atoms in the organic group increases, the modified 1,3-α-D-glucan polymer can become more soluble in organic solvents. Suitable organic solvents can include, for example, dimethyl sulfoxide, dimethyl acetamide, dimethyl formamide, pyridine, 1-methyl-2-pyrrolidinone, N-methylmorpholine-N-oxide, 1,3-dimethyl-2-imidazolidinone, dichloromethane, methanol, chloroform, tetrachloroethane, formic acid, acetic acid, nitrobenzene, bromoform, dioxane, ethanol, acetone, alcohols, aromatic compounds, such as, for example, monochlorobenzene, benzene and toluene; esters, such as, for example, ethyl acetate and propyl acetate; ethers, such as, for example; tetrahydrofuran, CELLOSOLVE™ solvents, ethylene glycol monomethyl ether. Combinations of any of the above listed solvents can also be used.

The solution of the modified 1,3-α-D-glucan polymer can contain in the range of from 2 to 75% by weight of the modified 1,3-α-D-glucan polymer, based on the total weight of the solution. In other embodiments, the solution can contain in the range of from 3 to 70% by weight or 4 to 65% by weight or 5 to 60% by weight or 5 to 50% by weight or 5 to 40% by weight or 5 to 30% by weight of the modified 1,3-α-D-glucan polymer, wherein the percentages by weight are based on the total weight of the solution. In other embodiments, the modified 1,3-α-D-glucan polymer can be present in the range of from 5 to 20% by weight or from 7 to 19% by weight or from 9 to 18% by weight or from 10 to 17% by weight or from 11 to 16% by weight, wherein the percentages by weight are based on the total weight of the solution. The solution can be prepared by adding the modified 1,3-α-D-glucan polymer to the solvent and agitating until a solution forms.

The solution can further comprise one or more additives, for example, pigments, dyes, rheology modifiers, toughening agents, fillers, antimicrobial agents, flame retardants, light stabilizers, UV absorbers or a combination thereof. The additives can be present in the range of from 0% to 50% by weight, based on the weight of the modified 1,3-α-D-glucan polymer present in the solution. In other embodiments, the additives can be present in the range of from 0% to 49% or 0% to 30% or 0 to 20% or 0% to 10% by weight, based on the total weight of the modified 1,3-α-D-glucan polymer in the solution. Additives to the solution may or may not be soluble in the solvent. If the optional additives are not soluble in the solution, then they should be well dispersed in the solution.

The process comprises a step of a) introducing the solution into a chamber. The introduction of the solution into the chamber can be done via a variety of methods. For example, the solution can be placed in a vessel that is subsequently pressurized via the action of a piston or a pump or a screw or increased atmospheric pressure, for example, nitrogen or air, in order to force or extrude the solution through a nozzle or spinneret and into the chamber. In other embodiments, the solution can be introduced into the chamber via the action of gravity, for example, allowing the solution to flow through an opening in a suitable vessel through the spinneret into the chamber. The solution can be introduced into the chamber through a single orifice or multiple orifices, for example, 2 to 100 or even up to several thousand orifices.

The chamber further comprises an opening for a pressurized gas to be introduced into the chamber and an opening to allow the fibers to exit the chamber. The pressurized gas can be a gas that is not reactive with the modified 1,3-α-D-glucan polymer, for example, air, nitrogen, helium, argon or a combination thereof. The pressurized gas is typically a dry gas, for example, a gas that has a water content of less than or equal to 10% or 5% or 1%. Contacting the pressurized gas with the solution in the chamber forms the modified 1,3-α-D-glucan polymer into fibers. In other embodiments, contact of the pressurized gas with the modified 1,3-α-D-glucan polymer can help to evaporate at least a portion of the solvent from the solution, thereby beginning the formation of the fibers of the modified 1,3-α-D-glucan polymer in the chamber. In some embodiments, the pressurized gas can be introduced into the chamber at a velocity in the range of from 10 to 340 meters/second and is at a temperature of from 20° C. to 120° C. as it is introduced into the chamber. In other embodiments, the pressurized gas can be introduced into the chamber at a velocity in the range of from 30 to 250 meters/second or from 50 to 160 meters/second. The exit velocity can be the measured value or a calculated value. In some embodiments, the chamber can be electrified to provide an electroblown nonwoven web. In other embodiments, a nonwoven web can be formed wherein the chamber does not include an electrical charge.

The process may further comprise the step of fragmenting the solution with the pressurized gas prior to step (c), collecting the fibers to form the nonwoven web. In some embodiments, the solution introduced into the chamber can be a steady stream of the solution. When viewing the so-produced nonwoven web, for example, using a scanning electron micrograph, relatively few, if any, fiber ends are present. As the pressure of the pressurized gas increases, the steady stream of the solution can be broken or fragmented, thereby forming relatively shorter fibers. The pressure at which the fragmentation occurs can vary depending upon several factors, including, for example, the concentration of the modified 1,3-α-D-glucan polymer in the solution, the viscosity of the solution, the amount and type of additives that can optionally be present in the solution or a combination thereof. One or ordinary skill in the art would be able to vary the process parameters in order to fragment the solution.

The pressurized gas, any fibers that have formed and/or the solution upon leaving the chamber, enter a zone of lower pressure. In some embodiments, the zone of lower pressure is at atmospheric pressure. In the zone of lower pressure, the solution forms fibers of the modified 1,3-α-D-glucan polymer. The fibers are then collected to form the nonwoven web of fibers in step c). The fibers can be collected on any suitable substrate. In some embodiments, the substrate can be a solid substrate, for example, a metal plate, metal roll, a polymeric plate or a polymeric roll or belt. In other embodiments, the substrate can be a perforated substrate, for example, a metal screen or a polymeric screen. Any of these substrates can be stationary or moving. The use of a screen or a perforated screen can allow the fibers to collect on one side of the screen while an area of low pressure can be applied to the opposite side of the screen, allowing for more efficient collection of the fibers. The area of low pressure can also be used to remove at least a portion of the solvent from the solution.

The fibers that are collected on the substrate comprise at least a portion of the solvent from the solution. These wet fibers can, in some embodiments, have enough polymer mobility to intermix one fiber to another fiber in contact with it to have polymer entanglements, thereby forming a spunbond nonwoven web. In other embodiments, there is very little polymer chain entanglement within adjacent fibers, resulting in a relatively loose nonwoven web.

The process can optionally further comprise step d) removing at least a portion of the solvent from the nonwoven web of fibers. The step of removing at least a portion of the solvent can be accomplished by evaporation, by washing the nonwoven web with a solvent, water, an acid, or by a combination thereof. For example, at least a portion of the solvent can be removed by utilizing a low pressure on one side of the screen used to collect the fibers. In other embodiments, at least a portion of the solvent can be removed by washing the nonwoven web with a solvent, for example, methanol or ethanol, followed by washing the nonwoven web with water. The acid can be acid or an aqueous acid. Suitable examples can include, for example, glacial acetic acid, aqueous acetic acid, aqueous hydrochloric acid, aqueous sulfuric acid, aqueous citric acid or a combination thereof. In still further embodiments, the acid is an aqueous mineral acid or an aqueous organic acid.

The nonwoven web can then be dried. The step of drying can be accomplished by increasing the temperature, lowering the pressure, blowing air onto the nonwoven web or by a combination thereof.

Optionally, the nonwoven web can be finished in any method known in the art. Suitable finishing steps can include, for example, mechanical finishing and/or chemical finishing. Further examples of mechanical finishing can be calendering, brushing, mechanical bonding, embossing, heating, laminating, creeping, crushing or a combination thereof. Suitable chemical finishing can include, for example, dyeing, chemical bonding, printing, surfacing, sizing, application of antimicrobial finishes, flame retardant finishes or a combination thereof. The finishing steps can comprise a combination of both chemical and mechanical finishing in any workable order.

The thus formed nonwoven web can be used, for example, for personal hygiene wipes, filtration media, gowns, surgical suits, shoe covers, caps, wound dressings, geotextiles, carpet backing, one or more layers in a multilayer laminate, shopping bags, porous packaging, thermal and acoustic insulation, disposable clothing, diapers, training pants, swimwear, incontinence garments, pads, sanitary napkins, as well as antimicrobial surgical gowns and bandages, protective workwear garments such as coveralls and lab coats.

The disclosure comprises several embodiments, wherein the first embodiment comprises:

1. introducing a solution of an 1,3-α-D-glucan polymer into a chamber;
   a) contacting a pressurized gas with the solution of step (a) in the chamber to form fibers; and
   c) collecting the fibers to form a nonwoven web;
wherein the 1,3-α-D-glucan polymer is a modified 1,3-α-D-glucan polymer.
2. The process of embodiment 1, wherein the modified 1,3-α-D-glucan polymer is modified with alkylcarboxy, ether, benzyl, formyl, ester groups or a combination thereof.
3. The process of any one of embodiments 1 or 2, further comprising a step of fragmenting the solution with the pressurized gas prior to step (c), collecting the fibers.
4. The process of any one of embodiments 1, 2, or 3, further comprising a step of d) removing at least a portion of the solvent from the nonwoven web of fibers.
5. The process of any one of embodiments 1, 2, 3, or 4, wherein the modified 1,3-α-D-glucan polymer is a linear polymer having greater than or equal to 99% of α-1,3-glycosidic linkages and less than 1% α-1,3,6-glycosidic branch points and a number average degree of polymerization in the range of from 55 to 10,000.
6. The process of any one of embodiments 1, 2, 3, 4, or 5 wherein the nonwoven web consists essentially of the modified 1,3-α-D-glucan polymer.
7. The process of any one of embodiments 1, 2, 3, 4, 5, or 6 wherein the 1,3-α-D-glucan polymer has a number average degree of polymerization in the range of from 55 to 10,000.
8. The process of any of embodiments 1, 2, 3, 4, 5, 6, or 7 wherein the pressurized gas is air.
9. The process of any of embodiments 1, 2, 3, 4, 5, 6, 7, or 8 wherein the 1,3-α-D-glucan polymer is produced by a glucosyl transferase enzyme having 90% or greater sequence identity to Gtf J.
10. The process of any of embodiments 1, 2, 3, 4, 5, 6, 7, 8, or 9 wherein the solution of the modified 1,3-α-D-glucan polymer comprises in the range of from 5 to 50% by weight of the modified 1,3-α-D-glucan polymer, wherein the percentage by weight is based on the total amount of the solution.
11. A nonwoven web comprising a modified 1,3-α-D-glucan polymer, wherein the 1,3-α-D-glucan polymer comprises 90% or greater α-1,3-glycosidic linkages, less than 1% by weight of α-1,3,6-glycosidic branch points, a number average degree of polymerization in the range of from 55 to 10,000.
12. The nonwoven web of embodiment 11, wherein the modified 1,3-α-D-glucan polymer has a number average degree of polymerization in the range of from 75 to 1,000.
13. The nonwoven web of embodiment 11 or 12, wherein the modified 1,3-α-D-glucan polymer is produced by a glucosyltransferase enzyme having 90% or greater sequence identity to Gtf J.
14. The nonwoven web of embodiment 11, 12, or 13, wherein the modified 1,3-α-D-glucan polymer is a linear polymer having greater than or equal to 99% of α-1,3-glycosidic linkages and less than 1% α-1,3,6-glycosidic branch points.
15. The nonwoven web of embodiment 11, 12, 13, or 14, wherein the modified 1,3-α-D-glucan polymer is modified with carboxyalkyl, ether, benzyl, ester groups or a combination thereof.

EXAMPLES

Preparation of the 1,3-α-D-Glucan Polymer

A procedure can be followed according to U.S. Pat. No. 8,871,474 using the enzyme gtf 0874. Gtf 0874 solution can be prepared by combining sucrose (50 g/L), potassium phosphate buffer (pH 6.5, 50 mM) and a gtf 0874 enzyme (2.5% extract by volume). After stirring the mixture for 24-30 hours at 22-25° C., the insoluble 1,3-α-D-glucan polymer can be isolated by centrifugation, followed by washing with water 3 times, once with ethanol and drying at 50° C. for 24-30 hours. As shown in Table 2 of U.S. Pat. No. 8,871,474, this can produce a polymer having 100% α-1,3-linkages.

Preparation of a Hydroxyethyl Ether Modified 1,3-α-D-Glucan Polymer

The 1,3-α-D-glucan polymer can be mixed with isopropanol and 30% aqueous sodium hydroxide. The preparation can be stirred for 1 hour at 55° C. followed by stirring overnight at room temperature. The mixture can then be transferred to a shaker tube where 15 grams of ethylene oxide can be added. The mixture can be sealed and shaken at 60° C. for 6 hours. The reaction can then remain in the sealed shaker tube overnight (approximately 16 hours) before it can be neutralized with acetic acid thereby forming hydroxyethyl 1,3-α-D-glucan polymer solids. The solids can be filtered using a Buchner funnel with 35-micrometer filter paper. The solids can then be washed in a beaker by adding a methanol:acetone (60:40 v/v) mixture and stirring with a stir bar. The methanol:acetone mixture can then be filtered away from the solids. This washing step can be repeated two times. The solids, can be dried in a vacuum oven with a nitrogen bleed.

Preparation of a Hydroxypropyl Ether Modified 1,3-α-D-Glucan Polymer

The 1,3-α-D-glucan polymer can be mixed with toluene and aqueous 20% sodium hydroxide. This preparation can be stirred in a glass beaker on a magnetic stir plate at 55° C. for 30 minutes. The preparation can then be transferred to a shaker tube reactor and propylene oxide can be added; the reaction can be stirred at 75° C. for 3 hours. The reaction can be neutralized with acetic acid and the solids can be filtered with a Buchner funnel. The solids can be washed with 70% ethanol and dried in a vacuum oven with a slight nitrogen bleed until constant dryness is achieved.

Preparation of an Ethyl Ether Modified 1,3-α-D-Glucan Polymer

The 1,3-α-D-glucan polymer can be added to a shaker tube, after which aqueous sodium hydroxide and ethyl chloride can be added to provide a reaction. The reaction can be heated to 25-200° C. and held at that temperature for 1-48 hours before the reaction is neutralized with acetic acid. The solid can be collected by vacuum filtration, washed and dried under a vacuum at 20-25° C.

Preparation of a Methyl Ether Modified 1,3-α-D-Glucan Polymer

The 1,3-α-D-glucan polymer can be mixed with 30% aqueous sodium hydroxide and isopropanol, and stirred at 55° C. for 1 hour. This preparation can then be filtered using a Buchner funnel. The resulting solids can then be mixed with isopropanol to make a slurry. A shaker tube reactor can be charged with the slurry and methyl chloride can be added to provide a reaction. The reaction can be stirred at 70° C. for 17 hours. The resulting solid can be filtered and neutralized with 90% acetic acid, followed by one or more ethanol washes.

Preparation of an Hydroxyalkyl Methyl Ether Modified 1,3-α-D-Glucan Polymer 1,3-α-D-glucan polymer is added to a vessel, after which sodium hydroxide (5-70% solution) is added. This preparation is stirred for 0.5-8 hours. Then, methyl chloride is added to the vessel to provide a reaction, which is then heated to 30-100° C. for up to 14 days. An alkylene oxide (e.g., ethylene oxide, propylene oxide, butylene oxide, etc.) is then added to the reaction while controlling the temperature. The reaction is heated to 25-100° C. for up to 14 days before being neutralized with acid. The solid product thus formed is filtered, washed and dried.

Thus, the glucan ether derivative, hydroxyalkyl methyl 1,3-α-D-glucan polymer, is prepared and isolated. Depending on the alkylene oxide used after the methylation step, examples of this derivative include hydroxyethyl methyl 1,3-α-D-glucan polymer, hydroxypropyl methyl 1,3-α-D-glucan polymer, and hydroxybutyl methyl 1,3-α-D-glucan polymer.

Preparation of a Carboxymethyl Hydroxyethyl Ether Modified 1,3-α-D-Glucan Polymer 1,3-α-D-glucan polymer is added to an aliquot of a substance such as isopropanol or toluene in a shaker tube, after which aqueous sodium hydroxide (1-70% solution) is added. This preparation is stirred for up to 48 hours. Then, monochloroacetic acid is added to provide a reaction, which is then heated to 25-100° C. for up to 14 days. Ethylene oxide is then added to the reaction, which is then heated to 25-100° C. for up to 14 days before being neutralized with acid (e.g., acetic, sulfuric, nitric, hydrochloric, etc.). The solid product thus formed is collected by vacuum filtration, washed and dried.

Thus, the glucan ether derivative, carboxymethyl hydroxyethyl poly alpha-1,3-glucan, is prepared and isolated.

Preparation of an Ester Modified 1,3-α-D-Glucan Polymer

Acetate modified 1,3-α-D-glucan polymer can be prepared according to commonly owned U.S. Pat. No. 7,000,000, the disclosure of which is incorporated herein by reference.

Preparation of a Benzyl Modified 1,3-α-D-Glucan Polymer

To a kettle is added aqueous sodium hydroxide and 1,3-α-D-glucan polymer. The solution is stirred for 16 hours at room temperature and benzyl chloride is added. The reaction is heated to 90° C. for 6 hours and then is cooled to room temperature. The reaction is blended with acetone and the precipitate is isolated by vacuum filtration. The polymer is purified by washing with acetone and water until the filtrate is colorless. Further purification can be performed by dissolving the polymer into dimethyl sulfoxide and precipitating into acetone. The precipitate is washed with acetone until the filtrate is colorless.

Preparation of a Nonwoven Web of a Modified 1,3-α-D-Glucan Polymer

The modified 1,3-α-D-glucan polymer is dissolved in a solvent and added to a spin reservoir. The reservoir is pressurized to about 3.5 kilograms/centimeter$^2$ and heated to 30-35° C. Air us blown into the spin chamber and the solution is spun onto a vacuum panel. The distance between the spin chamber and the vacuum panel can be 1 to 100 centimeters. The nonwoven web formed by this procedure is dried under vacuum.

Representative Preparation of Benzyl α-(1→3)-Glucan

To stirring deionized water (1.5 liters) in a 4 liter kettle was added α-(1→3)-glucan (250 grams, 87.5 percent by weight), deionized water (500 mL), and aqueous NaOH (500 mL, 28.1 percent by weight). The solution was stirred for 13 hours at room temperature. Benzyl chloride (265 milliliters (mL)) was added and the solution was heated to 90° C. for 3 hours. The reaction was cooled to room temperature and the product was isolated by vacuum filtration. The polymer was purified by washing with water until pH 7 and then with acetone until the filtrate was colorless. The polymer was dried in a vacuum oven at room temperature yielding benzyl α-(1→3)-glucan as a light beige colored solid (150.2 g, non-optimized). The degree of substitution (DoS=0.44) was determined by quantitative 13C-NMR in 90/10 (v/v) dimethyl sulfoxide-$d_6$/$D_2O$ with 3 percent by weight LiCl. Size exclusion chromatography in dimethyl sulfoxide with 2 percent by weight LiCl indicated a number average molecular weight of 84 kDa (kilo daltons) and a weight average molecular weight of 147 kDa.

Preparation of Nonwoven Web Comprising Benzyl α-(1→3)-Glucan

A 12 wt % solution of benzyl α-(1→3)-glucan in dimethylformamide (DMF) was prepared by mixing benzyl α-(1→3)-glucan, obtained similarly to the synthesis described herein above, with DMF. Polyethylene oxide was also added to the solution at 5 wt % based on the benzyl glucan. A magnetic stirrer was used to agitate the hot solution. The homogeneous solution was transferred to a sealed glass container and transported to the spin chamber. The solution viscosity at 20° C. was 7.1 Pa sec. The solution was transferred into the reservoir and sealed. The single spinning nozzle spinneret spin pack (described in U.S. Pat. No. 8,211,353 B2, which is incorporated herein in its entirety) was used for this experiment. A 0.508 mm inside diameter spinning nozzle was used. A drum collector was used to collect the sample. The distance from the spinneret exit to the drum surface was 45 cm. Air was used for the process jet. Hot air was used for the secondary process flows to control the relative humidity (Rh) and the temperature in the spin chamber. The spin cell temperature was close to 40° C. for the duration of the experiment. The Rh was less than 20%. A nitrogen pressure of 0. 275 MPa was used to maintain a solution flow rate of 0.72 ml/min. The flow to the process jet was controlled to maintain an exit velocity on the order of 140 m/sec. The process jet air temperature was close to 25° C. Once the solution flow was initiated, fiber was visible in the plume. Fiber was deposited in a swath on the drum surface. The sheet had some speckles present.

What is claimed is:

1. A nonwoven web comprising fiber, wherein the fiber consists of modified 1,3-α-D-glucan polymer that comprises 90% or greater α-1,3-glycosidic linkages,
   wherein the nonwoven web was formed on (i) a substrate under vacuum, (ii) a screen, (iii) a perforated substrate, or (iv) a belt.

2. The nonwoven web of claim 1, wherein the modified 1,3-α-D-glucan polymer has a number average degree of polymerization of 55 to 10000.

3. The nonwoven web of claim 2, wherein the modified 1,3-α-D-glucan polymer has a number average degree of polymerization of 75 to 1000.

4. The nonwoven web of claim 1, wherein the unmodified 1,3-α-D-glucan polymer from which the modified 1,3-α-D-glucan polymer is prepared was produced by a glucosyltransferase enzyme having 90% or greater sequence identity to GtfJ.

5. The nonwoven web of claim 1, wherein the modified 1,3-α-D-glucan polymer comprises 99% or greater α-1,3-glycosidic linkages.

6. The nonwoven web of claim 1, wherein the modified 1,3-α-D-glucan polymer is modified with at least one ether group.

7. The nonwoven web of claim 1, wherein the modified 1,3-α-D-glucan polymer is modified with a carboxyalkyl or benzyl ether group, or a combination thereof.

8. The nonwoven web of claim 1, wherein the modified 1,3-α-D-glucan polymer is modified with at least one carboxyalkyl ether group.

9. The nonwoven web of claim 8, wherein the carboxyalkyl ether group is carboxymethyl, carboxyethyl, carboxypropyl, carboxybutyl, or carboxypentyl.

10. The nonwoven web of claim 1, wherein the modified 1,3-α-D-glucan polymer is modified with at least one benzyl ether group.

11. The nonwoven web of claim 1, wherein the modified 1,3-α-D-glucan polymer is modified with at least one alkyl ether group.

12. The nonwoven web of claim 11, wherein the alkyl ether group is methyl, ethyl, propyl, butyl, pentyl, hexyl, heptyl, octyl, nonyl, or decyl.

13. The nonwoven web of claim 1, wherein the modified 1,3-α-D-glucan polymer is modified with at least one ester group.

14. The nonwoven web of claim 13, wherein the ester group comprises an acyl group that is an acetyl, propionyl, butyryl, pentanoyl, hexanoyl, heptanoyl, or octanoyl.

15. A nonwoven web comprising fiber, wherein the fiber comprises modified 1,3-α-D-glucan polymer that comprises 90% or greater α-1,3-glycosidic linkages, wherein the modified 1,3-α-D-glucan polymer is modified with at least one benzyl ether group.

16. The nonwoven web of claim 15, wherein the modified 1,3-α-D-glucan polymer has a number average degree of polymerization of 55 to 10000.

17. The nonwoven web of claim 16, wherein the modified 1,3-α-D-glucan polymer has a number average degree of polymerization of 75 to 1000.

18. The nonwoven web of claim 15, wherein the modified 1,3-α-D-glucan polymer is further modified with at least one carboxyalkyl ether group.

19. The nonwoven web of claim 18, wherein the carboxyalkyl ether group is a carboxymethyl group.

* * * * *